United States Patent [19]

Van Dijk et al.

[11] Patent Number: 4,965,062

[45] Date of Patent: Oct. 23, 1990

[54] HYDROGEN SULFIDE REMOVAL AND SULFIDE RECOVERY

[75] Inventors: Christiaan P. Van Dijk, Houston; Lowell D. Fraley, Sugarland, both of Tex.

[73] Assignee: Brudike Corporation, Houston, Tex.

[21] Appl. No.: 253,176

[22] Filed: Oct. 4, 1988

[51] Int. Cl.$^5$ .......................... C01B 17/05; B01D 5/00
[52] U.S. Cl. ................. 423/576.7; 23/293 S; 23/313 FB; 55/69; 422/189; 423/576.4
[58] Field of Search ............... 423/222, 576.2, 576.4, 423/576.7, 567 R, 543, 542; 55/69; 23/293 S, 313 FB; 422/189

[56] References Cited

U.S. PATENT DOCUMENTS

| | | | |
|---|---|---|---|
| 1,036,788 | 8/1912 | Blagburn | 423/543 |
| 1,832,448 | 11/1931 | Coleman et al. | 423/222 |
| 1,904,512 | 4/1933 | Nordlander | 423/543 |
| 1,905,901 | 4/1933 | Clark | 55/69 |
| 1,925,198 | 9/1933 | Melvill | 423/222 |
| 1,957,006 | 5/1934 | Wescott | 55/69 |
| 2,580,635 | 1/1952 | Winter, Jr. | 55/69 |
| 3,446,595 | 5/1969 | Guerrieri | 423/576.2 |
| 3,933,994 | 1/1976 | Rounds | 423/222 |
| 4,781,910 | 11/1988 | Van Dijk | 423/221 |

OTHER PUBLICATIONS

Hampel et al., The Encyclopedia of Chemistry, 3rd ed., Van Nostrand Reinhold Co, 1973, pp. 166-167.
Kohl et al., *Gas Purification*, 3rd ed, Gulf Publishing Co, 1979, pp. 163-165.

*Primary Examiner*—Jeffrey E. Russel
*Attorney, Agent, or Firm*—Ned L. Conley; David A. Rose; William E. Shull

[57] ABSTRACT

A process and apparatus for removing hydrogen sulfide from high pressure gas and recovering liquid sulfur, which includes reacting the H$_2$S with sulfite ions and an acetic acid-acid salt buffering system in an aqueous stream whereby liquid sulfur is formed, producing an effluent gas stream containing residual H$_2$S and an effluent aqueous stream containing the liquid sulfur, extracting the residual H$_2$S from the gaseous effluent stream, and using the extracted H$_2$S as well as H$_2$S recovered from the effluent aqueous stream as a source of sulfite ions for circulation to the reaction step, and as a source for additional liquid and solid sulfur. Apparatus and methods are also disclosed for recovering solid sulfur from a gaseous stream containing gaseous sulfur by contacting the gaseous stream with sulfur particles in a fluidized bed.

21 Claims, 1 Drawing Sheet

HYDROGEN SULFIDE REMOVAL AND SULFIDE RECOVERY

RELATED APPLICATION

This application is related to U.S. Pat. application Ser. No. 853,277 filed Apr. 17, 1986, now U.S. Pat. No. 4,781,910, issued Nov. 1, 1988, and entitled "Hydrogen Sulfide Removal and Sulfur Recovery."

BACKGROUND OF THE INVENTION

1. Field of Invention.

The present invention is directed to a process for removing hydrogen sulfide ($H_2S$) from a high pressure gas stream and recovering liquid elemental sulfur therefrom. More particularly the process of the present invention is particularly suited for the treatment of gas streams which contain in excess of 3 percent of $H_2S$ and are available at high pressures. Natural gas may contain $H_2S$ levels from one percent to 90 plus percent and may be recovered at pressures of 20 atmospheres gauge (atg) or more. By the process and apparatus of the present invention such natural gas containing three percent or more $H_2S$ is treated to remove the $H_2S$ so that the treated gas is suited for commercial use and, in addition, liquid elemental sulfur is produced.

2. Background of the Invention.

Hydrogen sulfide is often present in gas streams as a contaminant which makes the gas less desirable for domestic, commercial, or industrial purposes. This problem is particularly severe in sour natural gas, which is often produced with $H_2S$ concentration in excess of 5 percent to as high as 90 percent. Over the years, many desulfurization processes have been developed in attempts to free gas streams of hydrogen sulfide.

The commercial process most often used in removal of hydrogen sulfide from an acid gas or sour gas stream and the production of elemental sulfur is the Claus process. In this process, the gas stream containing the acid gas is first treated with a physical or chemical solvent for hydrogen sulfide. This extraction or washing step produces a clean, treated gas stream and an acid gas stream. The acid gas stream, mainly $H_2S$, and a controlled stoichiometric quantity of air are fed into a reaction furnace, where one-third of the $H_2S$ is burned to $SO_2$. The $H_2S$ and $SO_2$ react thermally in gas phase to form elemental sulfur in the furnace. Further, elemental sulfur is catalytically formed in the reactors which follow the sulfur furnace wherein the sulfur is produced according to the Claus reaction. One such commercial process is disclosed in Hydrocarbon Processing, Apr. 1982, p. 109. An additional step is usually required to clean the tail gas from the Claus reactors. Accordingly, the recovery of the sulfur by the so-called Claus process usually requires process steps: first, extraction of the $H_2S$; second, the reaction of $H_2S$ and the $SO_2$, first thermally in gas phase and then over a catalyst; and third, a tail gas cleanup reducing the $H_2S$ passed into the atmosphere, to be within restricted U.S. EPA standards.

Another commercial process for the removal of hydrogen sulfide and the partial removal of organic sulfur compounds from natural and industrial gases is the Stetford process. The sour natural or industrial gas is counter-currently washed with an aqueous solution containing sodium carbonate, sodium vanadate and anthraquinone disulfonic acid (ADA). The hydrogen sulfide dissolves in the aqueous solution and is removed to any desired level. The hydrosulfide form reacts with the five-valent state vanadium and is oxidized to elemental sulfur. The aqueous solution for extracting the sour gases is regenerated by air blowing, and the reduced vanadium is restored to the five-valent state through a mechanism involving oxygen transfer via the anthraquionone disulfonic acid. A specific example of this process is set forth in Hydrocarbon Processing, Apr. 1982, p. 112.

Still another process for the conversion of $H_2S$ to elemental sulfur is the LO-CAT process. This process utilizes an aqueous solution of iron held in solution by organic chelating agents. The aqueous solution containing the chelated iron serves as both a catalyst in the overall reaction of $H_2S$ with oxygen and takes part in the reactions by transfer of electrons. A more specific description of the process is set forth in *Hydrocarbon Processing*, Apr. 1985, pp.70-71.

U.S. Pat. No. 4,487,753 discloses a process for producing liquid elemental sulfur from a $CO_2$-rich gaseous stream containing $H_2S$. The gas, together with at least a stoichiometric amount of gaseous oxygen in the presence of liquid water, is contacted in a fixed bed comprising a catalyst selected from the group consisting of a transition metal phthalocyanine compound dispersed on a support at a specified pH and temperature. The patent discloses a preferred support as activated carbon.

A process which has been disclosed by Townsend and Reid (U.S. Pat. No. 3,170,766 and 1958 Oil Gas J. 56 [Oct. 13]:120), was proposed as a method for high-pressure natural gas desulfurization and production of elemental sulfur in one operation, thus continuing the conventional process of first absorbing hydrogen sulfide in an gaseous alkaline solution (e.g. ethanolamine), followed by processing the stripped acid gases in a Claus type sulfur plant. In the process sulfur is burned to produce $S_O2$ which is carried in a concentrated glycol solution. Solid sulfur is produced The glycol reactor is the equivalent of the catalytic converters of the Claus process.

U.S. Pat. No. 4,579,727, issued on the application of several applicants, including the present inventor, discloses a process for recovering elemental sulfur from a hydrogen sulfide containing gas stream by reacting the hydrogen sulfide in the gas stream with a buffered aqueous solution enriched in thiosulfate ions at an initial pH between about 4.5 and 6.5 for a residence time sufficient to react a portion of the hydrogen sulfide to elemental sulfur. The elemental sulfur is then removed and the solution now lean in thiosulfate ions is regenerated by the oxidation of the remaining hydrogen sulfide in the gas stream to deplete the hydrogen sulfide from the gas stream and to regenerate the liquid solution for recycling to the reduction zone.

In many respects, the method of Pat. No. 4,579,727 has advantages for the removal of $H_2S$ from gas streams and production of sulfur therefrom. However, due to the relatively low reaction rates the process requires large reaction vessels, especially when the $H_2S$ conversion is required to reduce $H_2S$ concentrations to very low levels. The major shortcoming of this process is the formation of appreciable quantities of sulfate ions, which leads to the necessity of cooling a large recycle to recover the sodium sulfate by crystalization under refrigeration. Furthermore, with this process, the sulfur product may be contaminated with $H_2S$. Finally, if nitrogen contamination of the gas stream is not allowed, it is necessary to use pure oxygen in the oxidation reaction.

The Bureau of Mines developed a process for desulfurizing industrial stack gases that contained $SO_2$. In Bulletin 686 by the United States Department of the Interior, Bureau of Mines entitled "The Citrate Process for Flue Gas Desulfurization" by W. I. Nissen et al published by the Superintendent of Documents in 1985, a process is disclosed in which $SO_2$ is absorbed and $H_2S$ is generated and reacted with the absorbed $SO_2$ for the formation of sulfur. The process includes six steps including (1) gas cleaning and cooling, (2) $SO_2$ absorption, (3) sulfur precipitation and solution regeneration, (4) sulfate removal, (5) sulfur recovery, and (6) $H_2S$ generation. In the chapter labeled Laboratory Investigations, the following absorbents were screened for $SO_2$ solubility:

| Organic absorbents: | Aqueous absorbents |
| --- | --- |
| Butyl phthalate | Citric acid-sodium hydroxide |
| Dimethyl heptanone | Diglycol amine |
| Dimethyl aniline | Gluconic acid-sodium hydroxide |
| Dioctylphthalate | Glycerine |
| Diphenyl cresyl phosphate | Levulinic acid-sodium hydroxide |
| Dow Corning 55 silicone | Maleic acid-sodium hydroxide |
| Dow Corning 710 silicone | Malic acid-sodium hydroxide |
| Ethylene glycol | Monethanolamine |
| Flerol TOF | Sodium acetate |
| GE SF 96 silicone | Sodium acetate-acetic acid |
| GE 1093 silicone | Sodium borate |
| Isodecanol | Sodium citrate |
| Kerosene | Sodium citrate-diglycol amine |
| Monsanto Therminal 66 | Sodium citrate-monoethanolamine |
| Monsanto Therminal 77 | Sodium citrate-sulfaline |
| O-toluidine | Sodium citrate-triethylene glycol |
| Stauffer 3664A polyester | Sodium hydroxide |
| Tetraethylene glycol | Sodium sulfite |
| Tributoxy ethyl phosphate | Sodium tartrate |
| Tributyl phosphate (TBP) | Sodium tetrathionate |
| Tricresyl phosphate | Sodium thiosulfate |
| Triethylene glycol | Triethanolamine |
| Triphenyl phosphate | Trisodium phosphate |
| Triphenyl phosphite | Trisodium phosphate-phosphoric acid |
| Xylidine | |
| 2, 6, 8-trimethyl nonanone | |
| 10 pct diphenylnaphthylamine in TBP | |
| 10 pct triethylene glycol in TBP | |

Of the absorbents screened the Citrate Process used the citric acid-sodium hydroxide or sodium citrate salt system. The sodium acetate absorbent was tested, but rejected on the ground that the high vapor pressure of acetic acid (248° F. boiling point) contributed to excessive reagent losses. The Citrate Process is carried out at low pressures and low temperatures.

SUMMARY OF THE INVENTION

The present invention is directed to a process for removing $H_2S$ from a high pressure gas stream and using it to produce liquid sulfur. The removal process of the present invention comprises, first, reacting the $H_2S$ by contacting the gas stream with an aqueous stream containing sulfite ions and an acid-acid salt buffering system whereby liquid sulfur is formed, producing an effluent gas stream containing residual $H_2S$ and an effluent aqueous stream containing the liquid sulfur and some $H_2S$ in solution. The removal process includes, second, extracting the residual $H_2S$ from the gaseous effluent stream, and using the extracted $H_2S$ as well as $H_2S$ recovered from the effluent aqueous stream as a source of sulfite ions for circulation to the reaction step.

In its more specific aspects, the present invention is directed to a process which includes three unit operations: removal of $H_2S$ from a high pressure gas stream, sulfite generation and liquid sulfur recovery. One aspect is the integration of these unit operations into an effective process for removing $H_2S$ and producing liquid sulfur in an effective, economical manner.

The present invention also includes a two component apparatus for removing sulfur from a high pressure gas stream containing $H_2S$. The first component comprises a reactor system wherein the gas stream containing the $H_2S$ is contacted with a buffered aqueous stream containing sulfite ions and an acid-acid salt buffering system producing an effluent gas stream containing residual $H_2S$ and an effluent depleted buffered aqueous stream containing liquid sulfur and some $H_2S$ in solution. The second component of the $H_2S$ removal apparatus is preferably an extraction system for absorbing the residual $H_2S$ from the gaseous effluent stream. The extraction system produces a gas stream essentially free of $H_2S$ and a highly concentrated stream of $H_2S$. The apparatus of the present invention also includes a sulfite generation or conversion system. Preferably, the extracted $H_2S$, together with $H_2S$ recovered from cleanup of the aqueous stream is used to produce sulfur dioxide, which is absorbed in the depleted buffered aqueous stream to regenerate sulfite ions. The liquid sulfur recovery system which recovers the sulfur from the reactor effluent aqueous stream completes the apparatus of the present invention.

It is significant to note that the sulfur produced according to the present invention is produced in liquid form, a form which is easily handled. It is also noted that the process provides for the complete removal of $H_2S$ from the liquid sulfur and thus a significantly pure sulfur is produced.

The process of the invention operates at high pressure, requiring no compression of the treated gas, and results in lower cost recovery of hydrogen sulfide.

BRIEF DESCRIPTION OF THE DRAWING

The present invention will be more readily apparent from the appended drawing which is a schematic flow diagram illustrating a preferred embodiment of the process and apparatus of the present invention.

DESCRIPTION OF THE INVENTION

Figure 1:
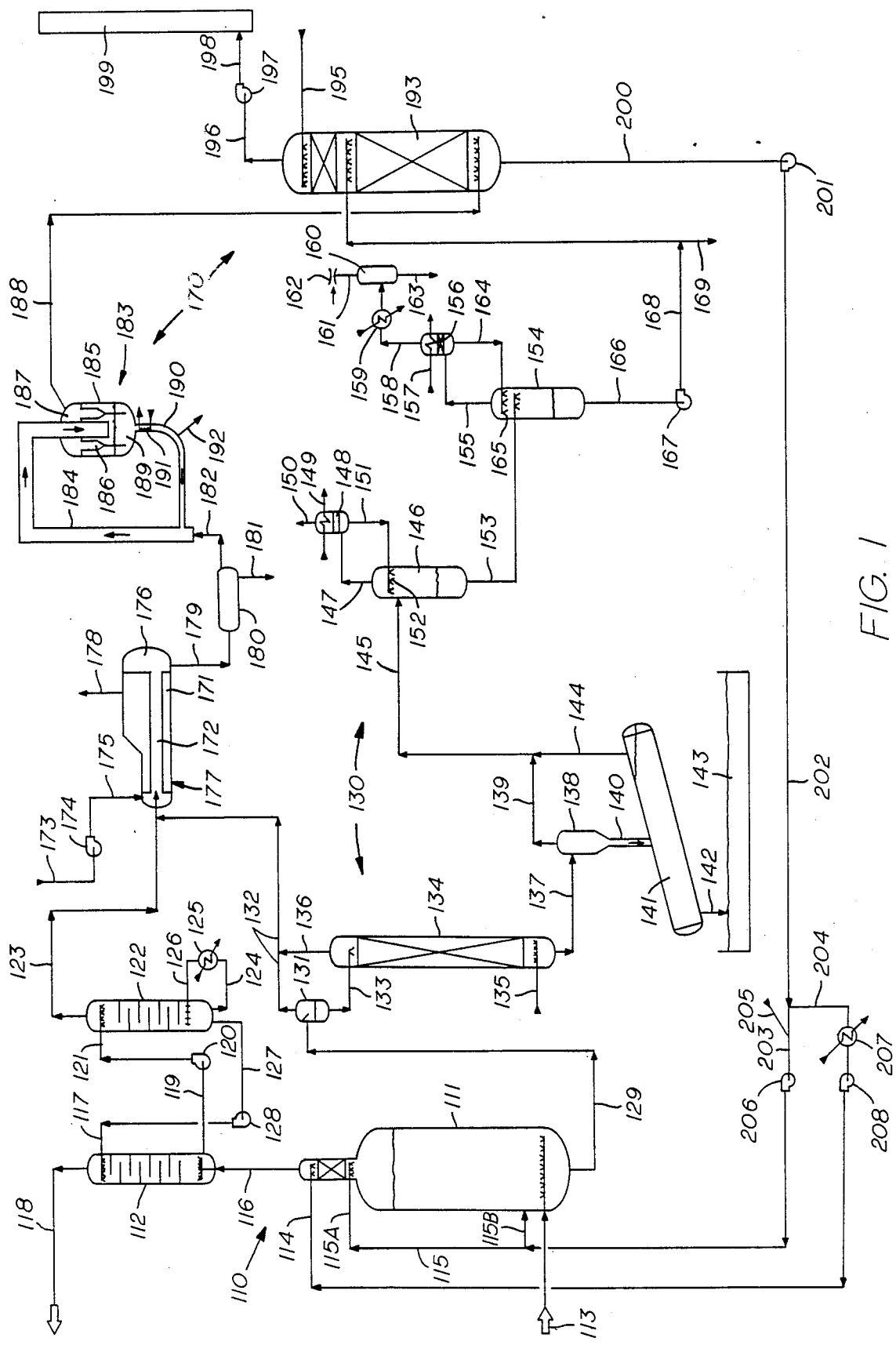

According to the present invention, a high pressure gas stream containing hydrogen sulfide ($H_2S$) is treated to remove the $H_2S$ in a two-step process. The first step and the second step are each carried out at the high pressure of the gas. The first step is the reaction of the $H_2S$ in the gas with an aqueous solution containing sulfite ions to form liquid elemental sulfur. The reaction step is carried out by contacting the high pressure gas stream in a reactor with an aqueous solution containing sulfite ions in an acid-acid salt buffering system. The sulfite ions, usually in the form of sodium sulfite or sodium bisulfite, react with the $H_2S$ to form liquid elemental sulfur and water. The reaction can be expressed as follows:

$$2\,H_2S + HSO_3^- + H^+ \rightarrow 3\,S + 3\,H_2O \qquad (1)$$

The reaction is carried out in the reactor with an excess of $H_2S$ being present. The reaction is exothermic, producing heat to produce a temperature high enough to insure that sulfur produced is in the liquid state.

The second step is to remove the residual $H_2S$ from the high pressure gas stream, preferably by liquid extraction. There are other known processes for removing $H_2S$ from gas streams, such as treating the stream chemically to remove the residual $H_2S$. As will be set forth in more detail hereinafter the preferred method is liquid extraction with an amine, sulfanol or other liquid extraction solvent for $H_2S$. The extracted $H_2S$ is then oxidized to produce $SO_2$ for absorption in the aqueous solution to regenerate sulfite ions.

The present invention contrasts with the known Claus process in reversing the unit operations used to remove $H_2S$ from a gas stream by employing a reaction step prior to the liquid solvent extraction step. One of the advantages of the present invention, therefore, in contrast to a Claus process, is a much smaller extraction system for the same volume of $H_2S$ to be removed from the gas stream since approximately two-thirds of the $H_2S$ is removed by reaction.

One of the other features of the present invention is that the reaction of $H_2S$ and the sulfite ion is carried out in the reactor in the presence of excess hydrogen sulfide. According to the present invention, the partial pressure of hydrogen sulfide in the exit effluent gas stream is at least 10 psi and preferably 100 psi or more. This insures that very little sodium sulfate will be produced in the reactor. Preferably slightly less than two-thirds of the $H_2S$ is reacted in the reactor.

The reaction of the hydrogen sulfide in the high pressure gas stream with the aqueous solution of sulfite ions is also carried out in an acid-acid salt buffering system. According to the present invention the acids used have a dissociation constant which is less than $1 \times 10^{-4}$. Acids having such a dissociation constant include acetic, oxalic, adipic and benzoic acids. Another feature of the acids is that they are stable under the reaction conditions. Acetic acid, which has a dissociation constant of $1.75 \times 10^{-5}$, is preferred because of its low cost.

The present invention can best be understood as being directed to a process or an apparatus which has three essential processing units or unit operations. The first is the $H_2S$ removal from a high pressure gas stream containing $H_2S$. The second unit operation is the sulfur recovery. The third unit operation is the sulfite generation. Each unit operation has a degree of independence but in the preferred embodiment each unit operation is integrated and interrelated to produce an efficient and economical plant.

The present invention is a substantial improvement over earlier $H_2S$—sulfite reaction processes, which produced solid sulfur. Solid sulfur often adhered to walls and other surfaces in the reactors, leading to undesired shutdowns. Another disadvantage of the production of solid sulfur is the difficulty of handling for disposal or sale.

In the Citrate Process the solid sulfur was converted into a liquid product. First, the sulfur was concentrated, because the handling of all the reactor effluent with its low sulfur concentration was uneconomical. This was followed by heat-exchange to above the sulfur-melting temperature. Both in the concentration and in the heat-exchange step, solid sulfur may deposit on the surface of the equipment, leading to necessary shutdowns for cleanup.

According to the present invention, it is preferred to react the aqueous liquid stream with hydrogen sulfide so that at no point in the reactor do conditions exist for formation of solid sulfur. Such a danger is completely avoided if sufficient backmixing of the liquid is allowed or induced to obtain a minimum temperature of 260° F. While it is possible to react the aqueous stream in plug-flow at temperatures above 260° F., backmixing of the liquid assure that the heat from the exothermic reaction will provide a temperature in excess of 260° F. throughout the reactor, even though cooler streams are introduced to the reactor.

As far as the reaction of the gas containing the hydrogen sulfide is concerned, it preferably should be plug-flow with minimal gas backmixing. This will insure maintaining a high hydrogen sulfide average partial pressure, which in turn will result in high reaction rates and maximal suppression of sulfate formation.

A preferred embodiment of the present invention is illustrated in the drawing. The three essential processing units of the preferred embodiment are the $H_2S$ removal section 110; the sulfur recovery section 130; and the sulfite generation section 170.

In the $H_2S$ removal section 110 a natural gas which may contain greater than 10% hydrogen sulfide ($H_2S$) and preferably in excess of 25% $H_2S$ is introduced to the $H_2S$ removal section 110. The $H_2S$ removal section 110 includes a reactor 111 and an absorber 112. The stream of gas at pressures in excess of 300 psi and usually in excess of 500 psi is introduced by line 113 at the lower end of the reactor 111. An aqueous stream containing sulfite ions and an acid-acid salt buffering system is introduced at the upper end of the reactor 111 through line 114. However, most of the aqueous stream is introduced to the reactor 111 by line 115 such a by lines 115A and 115B. The introduction of the plurality of aqueous streams containing the sulfite ion and buffering system provides substantial backmixing of the liquid, and the backmixing is enhanced by the gas introduced by line 113 in the reactor 111. The reactor may have multiple trays (not shown) for providing substantial gas liquid contact. In the reactor 111 the reaction (1) above is carried out to produce liquid sulfur. The reaction which produces sulfur is exothermic, and the conditions within the reactor 111 are maintained at temperatures above the melting point of sulfur, e.g. at least 260° F. The pH within the reactor is maintained between 5.0 and 7.0, and preferably between 5.5 and 6.5.

The required temperature is maintained throughout the reactor by controlling the amounts of gas and aqueous stream fed to the reactor, the temperature of the aqueous stream, the degree of reaction, and the amount of backmixing. The liquid streams are introduced to the reactor in such a way as to insure that the liquid is immediately brought to a temperature of at least 260° F., even though the liquid may be at a lower temperature, e.g. 200° F. to 250° F., before introduction to the reactor. This insures that no solid sulfur is produced in the reactor. Backmixing, or turbulence, of the liquid will insure that the heat of reaction produces and maintains the necessary temperature.

Reaction of two-thirds of the $H_2S$ and use of the other one-third as a source for sulfite ions provides a stoichiometrically balanced process. Preferably slightly less than two-thirds of the $H_2S$ is reacted. However, a larger proportion of the $H_2S$ can be reacted, and some of the sulfur produced can be burned to produce the necessary sulfite ions. It is desirable to maintain a substantial $H_2S$ partial pressure, i.e., at least 10 psi, in the effluent gas from the reactor in order to avoid the production of sulfates.

The effluent gas stream from the reactor 111, containing $H_2S$ with a partial pressure of at least 10 psi, is introduced through line 116 to an absorber 112. The absorption may be carried out with a well-known solvent for $H_2S$ such as an amine or sulfanol, which is introduced into the top of absorber 112 by line 117. The removal of $H_2S$ by liquid absorption is carried out so that substantially all of the $H_2S$ is removed from the gas stream and a purified gas stream is removed overhead by line 118. If there is $CO_2$ in the gas, some of it will also be removed.

Solvent extraction of $H_2S$ to purify a gas stream, so that the gas stream can be pipe-lined and the gas used in commerce, is well known. This unit operation, however, is also used to produce a highly concentrated $H_2S$ gas stream which is used to generate the sulfite needed in the aqueous stream for the reactor 111 as will be set forth in more detail hereinafter. The concentrated $H_2S$ solvent stream is removed from the bottom of the absorber 112 by line 119 and hydraulic motor 120, to recover energy, for introduction by line 121 to the regenerator 122. In the regenerator the concentrated solvent containing the $H_2S$ is heated wherein the $H_2S$ is removed from the solvent and passes as an overhead stream from the generator 122 by line 123. The solvent is heated by taking a portion from the bottom of the regenerator 122 by line 124 and passing in heat exchange with steam in heat exchanger 125 wherein the heated solvent without the $H_2S$ is reintroduced by line 126 to the regenerator 122. The regenerated solvent is removed from regenerator 122 by line 127 and introduced into pump 128 for reintroduction by line 117 to the absorber 112.

In summary, the $H_2S$ removal section 110 comprises a reaction of approximately two-thirds of the $H_2S$ to produce liquid sulfur. Approximately one-third of the $H_2S$ is then recovered from the reactor effluent gas by absorption by a solvent for the $H_2S$ and by steam stripping of the aqueous effluent from the reactor. The resulting $H_2S$ gas stream is used for the production of sulfite.

The aqueous affluent is removed from the bottom of the reactor 111 by line 129. This aqueous stream is introduced to the sulfur recovery section 130. The aqueous effluent from the reactor 111 is introduced to a flash drum 131 which includes a pressure let-down valve (not shown) to produce a gas and a liquid. The gas which is mostly $H_2S$ is removed from flash drum 131 by line 132. The liquid is removed from flash drum 131 by line 133 and introduced into a stripper 134. Stripper 134 is a packed bed. Steam is introduced into the bottom of the stripper 134 by line 135. The steam will strip any residual $H_2S$ in the aqueous stream and is removed from stripper 134 by line 136. Line 136 combines with the gas stream 132. In summary, the first step in the sulfur removal section 130 is to remove residual $H_2S$ in the aqueous stream and the liquid sulfur, which may be accomplished by flashing and steam stripping.

The aqueous stream from the stripper 134 is removed from the bottom by line 137 and introduced to a cyclone separator 138. The aqueous stream being lighter than the liquid sulfur goes overhead and is removed by line 139. The liquid sulfur, being the heavier of the materials, is removed from the bottom of cyclone separator 138, together with a small amount of the aqueous layer, by line 140, and is introduced to a settler 141. In the settler 141 the liquid sulfur will gravitate to the bottom where it may be removed by line 142 for introduction into sulfur storage 143. Throughout these operations, the sulfur is maintained at a temperature above 260° F. so that the sulfur remains as a liquid and is easily handled and is readily available as a material for sale. Liquid sulfur may be easily transported by truck or rail car as a liquid and is maintained by either slight heating or using proper insulation to retain the heat already in the product. Aqueous liquid separated in the settler 141 is removed by line 144 and combined with the aqueous stream from line 139 in line 145.

In this preferred embodiment a liquid sulfur produced in the reactor 111 is separated from the liquid stream as a liquid ready to be placed in storage Furthermore, the residual amounts of $H_2S$ are reduced to nil by the steam stripping carried out in stripper 134. The sulfur product, therefore, need not be further treated to make it a commercial product useful for many purposes.

The aqueous stream in line 145 is introduced to a first flash vessel 146 where the pressure may be let down through a let-down valve or pressure reduction valve (not shown) so as to produce steam and liquid in the flash drum 146. The steam is removed overhead by line 147 and is passed to a condenser 148 which is cooled by cooling water introduced by line 149 to provide a steam stream which is removed by line 150. This steam produced in the flashing may be used for example for heating the recycle liquid aqueous stream, or for other heat duty purposes The liquid produced in the condenser 148 is removed by line 151 and is used as a reflux and sprayed through spray means 152 in the flash drum 146 The liquid in the flash drum 146 is removed by line 153 for introduction into a second flash drum 154. The liquid in line 153 passes through a pressure reduction or a let-down valve (not shown) to produce a gas and liquid in flash drum 154. The gas is removed by line 155 and passed to a condenser 156. Cooling water is passed through the condenser through line 157 and the gas removed by line 158. Removed gas is passed through a heat exchanger 159 which may be cooled by cooling water and thereafter passed into a separator vessel 160. The gas from the separator vessel 160 is removed by line 161 where it may be passed into a steam eductor 162. A liquid stream may be removed from the separation vessel 160 by line 163.

The liquid produced in condenser 156 is removed by line 164 for reintroduction into the flash vessel 154. That liquid can be used as a reflux and is introduced through spray means 165 in the flash vessel 154. The liquid in the flash drum 154 is removed by line 166 and introduced into a pump 167 where it is passed into line 168 for introduction into a scrubber, which will be described in more detail hereinafter. A purge stream may be removed from line 168 at 169.

The third processing unit of the present invention is a sulfite generation section 170. The sulfite generation section 170 comprises a $H_2S$ burner/boiler 171. The boiler has a plurality of tubes 172. The concentrated $H_2S$ stream from the regenerator 122 and the stripped $H_2S$ which may contain $H_2S$ and steam, is introduced into the plurality of tubes by lines 123 and 132. If desired, some sulfur can also be introduced and burned. These combined streams are combined with air which is introduced by line 173 through a blower 174 into line 175 for introduction into the plurality of tubes 172. While only one tube is illustrated in the drawing, the plurality of tubes 172 are a tube bundle with a common plenum for the H₂S and air to enter. In the preferred embodiment, the burning of the H₂S is very carefully controlled by introducing less than a stoichiometric amount of oxygen for production of $SO_2$ from the H₂S present. The production of $SO_3$, which can result in the production of insoluble sulfates, is therefore avoided.

The burning of H₂S or sulfur in the tubes 172 produces sulfur dioxide according to the following reactions:

$$2 H_2S + 3 O_2 \rightarrow 2 SO_2 + 2 H_2O \quad (2)$$

$$S + O_2 \rightarrow SO_2 \quad (3)$$

The resulting gas stream, containing at least 8% and preferably at least 12% $SO_2$ on a dry basis, will contain some sulfur in gaseous form. This stream is collected in a plenum 176 in the H₂S burner boiler 171. Water is introduced to the boiler 171 by line 177 and is used to cool the tube bundle 172 and produce steam which is removed by line 178. At the same time the gas stream is cooled to a temperature above 260° F. so that some of the sulfur becomes liquid. The steam produced is used in the process in such operations as the steam for the steam stripper 134 but also for the adjustment of the temperature of the recycled aqueous stream.

The gas stream containing $SO_2$, gaseous sulfur and liquid sulfur produced in the H₂S burner/boiler 171 is removed by line 179 and introduced into a sulfur settler 180 at a temperature of at least 260° F. Here, liquid sulfur which is produced is removed by line 181. A gaseous effluent, containing $SO_2$ and some gaseous sulfur is removed from the sulfur settler 180 by line 182 and introduced to a circulating bed 183 having a fluidized bed leg 184. A fluidized bed stream comprising $SO_2$ rich gas and particles of solid sulfur, at a temperature below the melting point of sulfur, e.g. 205° to 235° F., flows through the leg 184. The particles of solid sulfur provide nuclei on which molecules of gaseous sulfur may condense to form larger particles of solid sulfur. Heat losses in the system may lower the temperature to the desired range of e.g. 205° to 235° F., or alternatively, additional cooling may be provided to obtain such temperatures, so that the sulfur is solidified. The fluidized stream flows into a vessel 185 which may, for example, comprise a cyclone separator. A portion of the gaseous material, including $SO_2$, passes upwardly through cyclone separators 186 to an upper plenum 187, and is removed by line 188. The solid sulfur collects in the bottom of lower portion 189 of vessel 185 for removal by lines 190 and 192. Leg 190 may include a heat exchanger 191. Some of the solid sulfur, however, remains in leg 190 for introduction into the leg 184 to provide the solid nuclei to contact the gas stream introduced by line 182. This circulating bed 183 provides an easy and effective means for collecting and removing the sulfur produced in the H₂S burner/boiler 171. A bubbling fluid bed of sulfur solids could also be used, with continuous removal of solid sulfur from the bed. Heretofore, the use of excess oxygen has been used to prevent the production of sulfur. However, such a solution has the detrimental effect of producing $SO_3$, leading to the formation of sulfates, which is detrimental to the overall recovery of the sulfur.

The apparatus described is preferred for removal of sulfur from the effluent from the furnace, thus avoiding the formation of amorphous sulphur on cooling the gas directly from about 260° F. to about 160° F. Such amorphous sulfur sticks to surfaces and leads to early shutdowns. However, other apparatus may also be used. In addition, the process may be varied so that no sulfur is produced in the furnace, or so that the sulfur is recovered in liquid phase. Although not preferred, the process may also be operated in such a way to produce amorphous sulfur.

The $SO_2$ stream in line 188 is introduced to the bottom of a scrubber 193. The aqueous stream which contains the acid-acid salt buffering system is introduced by line 168 into the top of the scrubber 193, and delivered as a spray, scrubbing the $SO_2$ from the gas stream. Additional water containing buffering solution can be added by line 195 to reduce the level of $SO_2$ in the gas so that there is very little remaining. The gas is removed from the top of the scrubber 193 by line 196 where it is passed through a fan 197 and through a line 198 to a stack 199 where it can be vented to the atmosphere. In addition, if necessary, a heat exchanger can be included in line 196 to cool the exhaust gas and condense vapor which can then be used as a reflux in the scrubber 193.

The absorption reaction may be illustrated as follows:

$$SO_2 + H_2O \rightarrow H^+ + HSO_3^- \quad (4)$$

The preferred acid-acid salt buffering system is acetic acid and its sodium salt, sodium acetate. In the $SO_2$ absorption the buffer solution reacts as follows:

$$H^+ + HSO_3^- + Na^+ + acetate^- \rightarrow Na^+ + HSO_3^- + acetic\ acid \quad (5)$$

The absorption of $SO_2$ decreases the pH of the solution. The buffered solution absorbs a greater amount of $SO_2$ than a nonbuffered solution. The pH of the solution as it leaves the scrubber 193 will be between 3.5 and 5.0.

The apparatus and method described are preferred for absorption of $SO_2$ to produce sulfite ions. However, other methods and apparatus which provide efficient production of sulfite ions may also be used.

An aqueous stream which contains sulfite ions due to the absorption of the $SO_2$ in the water is removed from the bottom of the scrubber 193 by line 200 to a pump 201. From the pump 201 this aqueous stream is passed through line 202 where it is branched into two lines, 203 and 204. Into the line 203, steam may be added by line 205 to adjust the temperature of the aqueous stream to a temperature between 180° F. and 260° F. for introduction into the reactor 111. The heated stream is passed into a pump 206 where it may be reintroduced by lines 115 through lines 115A, 115B, etc. at various points within the reactor 111. The second stream may be passed through a heat exchanger 207 and then through a pump 208 for a reintroduction through line 114 into the reactor 111.

The present invention will be understood in more detail with reference to the following example.

EXAMPLE

A natural gas stream of 6 million standard cubic feet per day (MM scfd) contains 86 moles per hour (MPH) $CO_2$, 13 MPH $N_2$, 284 MPH $CH_4$, and 277 MPH H₂S. The gas stream is fed into a 1900 cubic feet (cf) reactor at 1000 psig and a temperature of 300° F. In this reactor part of the H₂S reacts with a liquid containing sodium bisulfite. The liquid is backmixed by the rising gas bubbles. Backmixing is further promoted by the major part of the liquid being injected a various levels in the reactor at high velocity. The pH of the liquid is controlled by a sodium acetate-acetic acid buffer. The reaction can be written as:

$$2 H_2S + NaHSO_3 + HAc \rightarrow 3S + NaAc + 3 H_2O \quad (6)$$

where Ac is an acetate ion. The gas out of the reactor still contains 78 MPH $H_2S$. This is removed by a standard extraction, removing $H_2S$ with only minor amounts of $CO_2$. Finally, $CO_2$ is also removed to result in a gas stream containing 284 MPH $CH_4$, 13 MPH $N_2$, 2 MPH $CO_2$, and 4 ppm $H_2S$. This gas is fed to a pipeline.

The liquid exiting from the reactor contains about 15 MPH $H_2S$. It also contains 276 MPH liquid sulfur. The $H_2S$ is removed by a flash at 81 psia, followed by stream stripping at 72 psia. The different $H_2S$ streams from extraction, flashing and stripping are combined, resulting in a total of 93 MPH $H_2S$ and 44 MPH of steam. This is burned with about 663 MPH air, which is slightly below stoichiometry for producing $SO_2$ exclusively:

$$92.85 H_2S + 139.28 O_2 \rightarrow 92.85 SO_2 + 92.85 H_2O \quad (2)$$

and:

$$0.15 H_2S + 0.075 O_2 \rightarrow 0.15 S + 0.15 H_2O \quad (3)$$

Steam is raised from the heat of the burner The final temperature of the burner gas is 260° F., at which temperature a small amount of liquid sulfur is separated. The final removal of sulfur is by direct contact with solid sulfur in one or two (only one is shown) fluid beds or circulating fluid beds at increasingly lower temperatures. This eliminates the well-known danger of subcooling and formation of plastic sulfur, which settles down as a hard mass on all surfaces. Finally the gas is counter-currently contacted with the recirculating aqueous liquid:

$$SO_2 + H_2O + NaAc \rightarrow NaHSO_3 + HAc \quad (4)$$

Due to the relatively high pH of the aqueous solution the $SO_2$ is quite soluble in the buffered solution. Before being fed to the $SO_2$ absorber the aqueous solution is cooled down and brought to the proper water content by flashing first at about 1 psig, and then in vacuo at 2.5 psia. In both flashes sufficient reflux is taken to limit water removal to the desired amount. After the flashings a bleed is taken to keep the amount of sodium sulfate in the solution constant. At the high $H_2S$ level in the reaction only 0.15 MPH $Na_2SO_4$ is formed. As this small amount can easily be removed by a bleed, a bleed of 0.4 MPH $NaHSO_3$, 0.75 MPH NaAc, 0.05 MPH HAc and 0.15 MPH $Na_2SO_4$ is taken, together with the corresponding amount of water. After the bleed a make-up of 0.8 MPH NaAc and 0.65 MPH NAOH is introduced. A small part of the liquid, containing the absorbed $SO_2$, namely about 4890 #/hr, or 8.5 gpm, is cooled down to about 110° F., pumped up to about 1015 psig and injected in the top of the reactor to aftercool the gaseous exit stream. The rest of the $SO_2$-containing liquid, about 75900 #/hr, or 138.5 gpm, is pumped up to an intermediate pressure of about 30 psig. Steam is introduced to warm up the liquid to about 229° F. The liquid is then fed to a second pump, which increases the pressure to about 1040 psig. Most of the liquid is injected into the back mixed reactor, but a small amount is used to cool down the exit gas stream to about 260° F. This ends the cycle of the aqueous flow. It may improve the understanding of the balance of flow around the loop to provide the flows of MPH of the different salts at different points of the loop:

Flow to purge (line 168) 68 MPH $NaHSO_3$, 120 MPH NaAc, 8 MPH HAc, 25 MPH $Na_2SO_4$; Purge taken (line 169) 0.4 $NaHSO_3$, 0.75 NaAc, 0.05 HAc, 0.15 $Na_2SO_4$. Make-up (line 195) 1.45 NaOH, 0.8 HAc. Composition fed to scrubber 67.6 $NaHSO_3$, 120.70 NaAc, 7.30 HAc, 24.85 $Na_2SO_4$ to absorber 92.75 MPH. Composition in line 200 160.35 $NaHSO_3$, 27.95 NaAc, 100.05 HAc, 24.85 $Na_2SO_4$. Reactions in reactor 111:

$$92.075 NaHSO_3 + 92.075 HAc + 184.15 H_2S$$
$$\rightarrow 276.225 S + 92.075 NaAc + 276.225 H_2O$$
$$0.225 NaHSO_3 + 0.075 NaAc \rightarrow 0.15 Na_2SO_4 + 0.075 S + 0.075 HAc + 0.075 H_2O.$$

This re-establishes the starting salt composition. Water from reactions and water added in open steam use can easily be removed by the flashes and in gases to stacks.

The experiments carried out to supply the data in the foregoing calculated example had measured reaction rates which indicated a commercially viable process. Notwithstanding these positive data, analysis showed the possibility of reaction rate limitations due to lack of intensive mass transfer between gas and liquid. Therefore, it is expected that with intensive mass transfer between gas and liquid the reaction rates will be substantially enhanced.

The use of the acetate buffer system (and its family of acids with similar low dissociation constants) has significant advantages in the process of this invention. The Bureau of Mines article, discussed supra, rejects acetic acid because of excessive loss of reactant in the flue gas cleaning process described, due to the acid's high vapor pressure In the present process, however, the loss of acetic acid is insignificant.

The concentration of $SO_2$ in the inlet gas is quite high as compared to the concentration in the flue gasses which were the subject of the Bureau of Mines investigation. In this process, the concentration of $SO_2$ in the inlet gas is at least 8% on a dry basis due to the proportions of reactants in the furnace, and may be 12% or more. In the flue gasses, the concentration of $SO_2$ was very low, so that the total volume of gas was quite high in proportion to the amount of $SO_2$. In addition, in the present invention the spent buffered solution introduced to the absorber is highly basic, containing predominantly sodium acetate rather than acetic acid. Thus a counter-current flow in the absorber can be used very effectively, with the gas being fed in at the bottom and flowing upwardly through the falling liquid. Reaction of the $SO_2$ to form sulfite ions and acetic acid will proceed rapidly at the bottom of the column, diminishing as $SO_2$ is absorbed as the gas flows upwardly, so that little acetic acid can reach the top of the column, and hence little can be lost in the exhaust gas. The provision of a reflux can reduce the loss even further. Such reflexes can also be used at other points in the process where acetic acid loss may be encountered.

An added advantage of the process is the reduction of the amount of $SO_2$ to a substantially lower level than was possible with the citrate system preferred by the Bureau of Mines.

In the prior art it was necessary to use an excess of air to burn $H_2S$ to produce $SO_2$, in order to avoid production of solid sulfur which could adhere to process equipment. This excess of air resulted in the production of sulfate as a waste product of little value which had to be disposed of. The process of this invention uses less than a stoichiometric quantity of air, intentionally producing sulfur as a valuable product, and avoiding the production of significant amounts of sulfate. This innovation is made possible by the novel sulfur recovery system which includes a fluidized bed.

The process results in a very high sulfite ion concentration in the feed to reactor 111, providing a much larger increase in temperature for the same total heat of reaction. As a result, when sprayed into the reactor with substantial backmixing, the liquid is quickly heated by the heat of reaction to a temperature, preferably at least 260° F., high enough to insure that no solid sulfur is produced by the reaction. Because of the heat rapidly supplied to the liquid as it is fed into the reactor, only a relatively modest preheat of the buffered aqueous stream is required, and it is not necessary to use expensive heat exchange to control the reactor temperature.

Because of the high sulfite ion concentration in the buffered aqueous stream, and the modest preheat required, the necessary heat can be provided by direct injection of steam into the stream before it enters the reactor. Suitable steam is produced by the H$_2$S burner. Thus the use of heat exchangers, with their high cost and corrosion problems, is avoided.

A preferred embodiment of the invention has been shown and described. Other embodiments and variations within the scope of our invention will achieve many or all of the advantages of the invention, and will be apparent to those skilled in the art upon reviewing the foregoing disclosure. The invention claimed is therefore not limited to the embodiments and variations disclosed, but includes all methods and apparatus within the scope of the following claims.

We claim:

1. A process which comprises:
    contacting a gas stream containing hydrogen sulfide with an aqueous stream containing an acid-acid salt buffering system and less than a stoichiometric amount of sulfite ions to produce an effluent gas stream containing residual H$_2$S and an effluent aqueous stream containing liquid sulfur; and
    extracting residual H$_2$S from the effluent gas stream, and oxidizing residual H$_2$S to produce sulfur dioxide.

2. A process as defined by claim 1 wherein the acid-acid salt buffering system includes an acid having a dissociation constant less than about $1 \times 10^{-4}$ and a salt of said acid.

3. A process as defined by claim 1 wherein the acid-acid salt buffering system includes (1) an acid selected from the group consisting of acetic acid, oxalic acid, adipic acid and benzoic acid, and (2) a salt of the selected acid.

4. A process as defined by any of claims 1, 2 and 3 wherein the residual H$_2$S has a partial pressure of at least 10 psi.

5. A process as defined by either of claims 1 and 2 and including
    recovering liquid sulfur from the effluent aqueous stream,
    recovering H$_2$S from the effluent aqueous stream,
    oxidizing the extracted and recovered H$_2$S with less than a stoichiometric amount of oxygen to produce sulfur dioxide and gaseous sulfur,
    cooling a portion of the gaseous sulphur to condense liquid sulfur,
    separating the liquid sulfur from the remaining gaseous sulfur,
    contacting the remaining gaseous sulfur at a temperature of 205° F. to 235° F. with a fluidized bed containing particles of solid sulfur, whereby gaseous sulfur condenses on the solid particles,
    separating gas containing sulphur dioxide from the fluidized bed,
    recovering solid sulfur from the fluidized bed, and
    using the sulfur dioxide to regenerate sulfite ions in the aqueous stream.

6. A process as defined by any of claims 1, 2 and 3 wherein the pH during said contacting is maintained at from 5.0 to 7.0.

7. A process as defined by any of claims 1, 2 and 3 wherein the extracted residual hydrogen sulfide is oxidized to produce an effluent gas stream containing at least 8% sulfur dioxide on a dry basis, liquid sulfur is separated from the effluent aqueous stream, and the sulfur dioxide-containing gas stream is contacted in an absorber with the resulting liquid aqueous stream to produce a buffered aqueous stream containing sulfite ions and a substantially sulfur dioxide-free exhaust gas.

8. A process as defined by claim 7 and including separating liquid sulfur from the effluent gas stream.

9. A process as defined by claim 7 and including separating solid sulfur from the effluent gas stream.

10. A process as defined by claim 7 wherein the oxidation is carried out in a boiler with less than a stoichiometric amount of oxygen, whereby the effluent gas stream contains sulfur in liquid and gaseous form, and including
    separating liquid sulfur from the effluent gas stream,
    cooling the resultant gas stream to below the melting point of sulfur, and
    removing solid sulfur from the gas stream.

11. A process which comprises:
    contacting a gas stream containing hydrogen sulfide with an aqueous stream containing an acid-acid salt buffering system and less than a stoichiometric amount of sulfite ions to produce an effluent gas stream containing residual H$_2$S and an effluent aqueous stream containing liquid sulfur;
    extracting residual H$_2$S from the effluent gas stream, oxidizing residual H$_2$ to produce sulfur dioxide, and using sulfur dioxide so produced to regenerate the sulfite ions in the aqueous stream.

12. A process as defined by claim 11 wherein approximately one-third of the hydrogen sulfide from the gas stream is oxidized.

13. A process as defined by claim 12 wherein oxidation is carried out with less than a stoichiometric amount of oxygen.

14. A process as defined by claim 13 and including the separation of liquid sulfur from the products of the oxidation step.

15. A process as defined by claim 14 and including the separation of solid sulfur from the products of the oxidation step.

16. A process for removing H$_2$S from a gaseous stream at pressures in excess of 500 psi which comprises:
    contacting said gaseous stream with an aqueous stream containing sulfite ions and an acid-acid salt buffering system to react said H$_2$S to produce an effluent gas stream containing residual H$_2$S having a partial pressure of at least 10 psi and an effluent aqueous stream containing liquid sulfur;
    extracting residual H$_2$S from the effluent gas stream;

converting said extracted H$_2$S to a source of sulfite ions; and recovering the sulfur from said effluent aqueous stream.

17. A process for removing H$_2$S from a gas stream at a pressure of 20 atmospheres gauge or more containing in excess of 5% H$_2$S which comprises:

contacting said gas stream with an aqueous stream containing sulfite ions and an acid-acid salt buffering system at temperatures above 260° F. to produce an effluent gas stream containing residual H$_2$S and an effluent aqueous stream containing liquid sulfur;

extracting residual H$_2$S from the effluent gas stream;

converting said extracted H$_2$S to a source of sulfite ions; and recovering the sulfur from said effluent aqueous stream.

18. A process comprising:

contacting a gas stream containing hydrogen sulfide with a buffered aqueous stream containing sulfite ions and an acid-acid salt buffer which includes (1) an acid selected from the group consisting of acetic acid, oxalic acid, adipic acid and benzoic acid and (2) a salt of the selected acid, to cause a reaction to produce an effluent aqueous stream containing liquid sulfur while maintaining the produced sulfur at a temperature of at least about 260° F. and a gaseous effluent having a partial pressure of hydrogen sulfide of at least 10 psi;

extracting hydrogen sulfide from the gaseous effluent by solvent extraction to produce a substantially hydrogen sulfide-free gaseous effluent and a solvent containing hydrogen sulfide;

regenerating the solvent to produce a substantially hydrogen sulfide-free solvent and a gaseous effluent rich in hydrogen sulfide;

oxidizing the latter gaseous effluent to produce a sulfur dioxide-containing gaseous stream;

separating liquid sulfur from said effluent aqueous stream; and contacting said sulfur dioxide-containing gaseous stream with said aqueous stream in an absorber to produce a buffered aqueous stream containing sulfite ions and a substantially sulfur dioxide-free exhaust gas.

19. A process as defined by claim 18 wherein the pH during said contacting is from 5.0 to 7.0.

20. A process as defined by either of claims 18 and 19 wherein the sulfur dioxide concentration in the sulfur dioxide-containing gaseous stream is at least about 8% on a dry gas basis.

21. Apparatus for recovering sulfur from a gas stream at a pressure of 20 atmospheres gauge or more containing H$_2$S which comprises:

reactor means for counter-currently contacting said gas stream with an aqueous stream containing sulfite ions and an acid-acid salt buffering system to produce an effluent gas stream containing residual H$_2$S and an effluent aqueous stream containing liquid sulfur;

solvent extraction means for contacting the gaseous effluent stream with a solvent for H$_2$S to produce an effluent stream of solvent containing H$_2$S and a gas stream substantially free of H$_2$S;

means for converting said effluent stream containing H$_2$S to a source of sulfite ions;

means for circulating said sulfite ions to said reactor means; and

* * * * *